Figure 1:
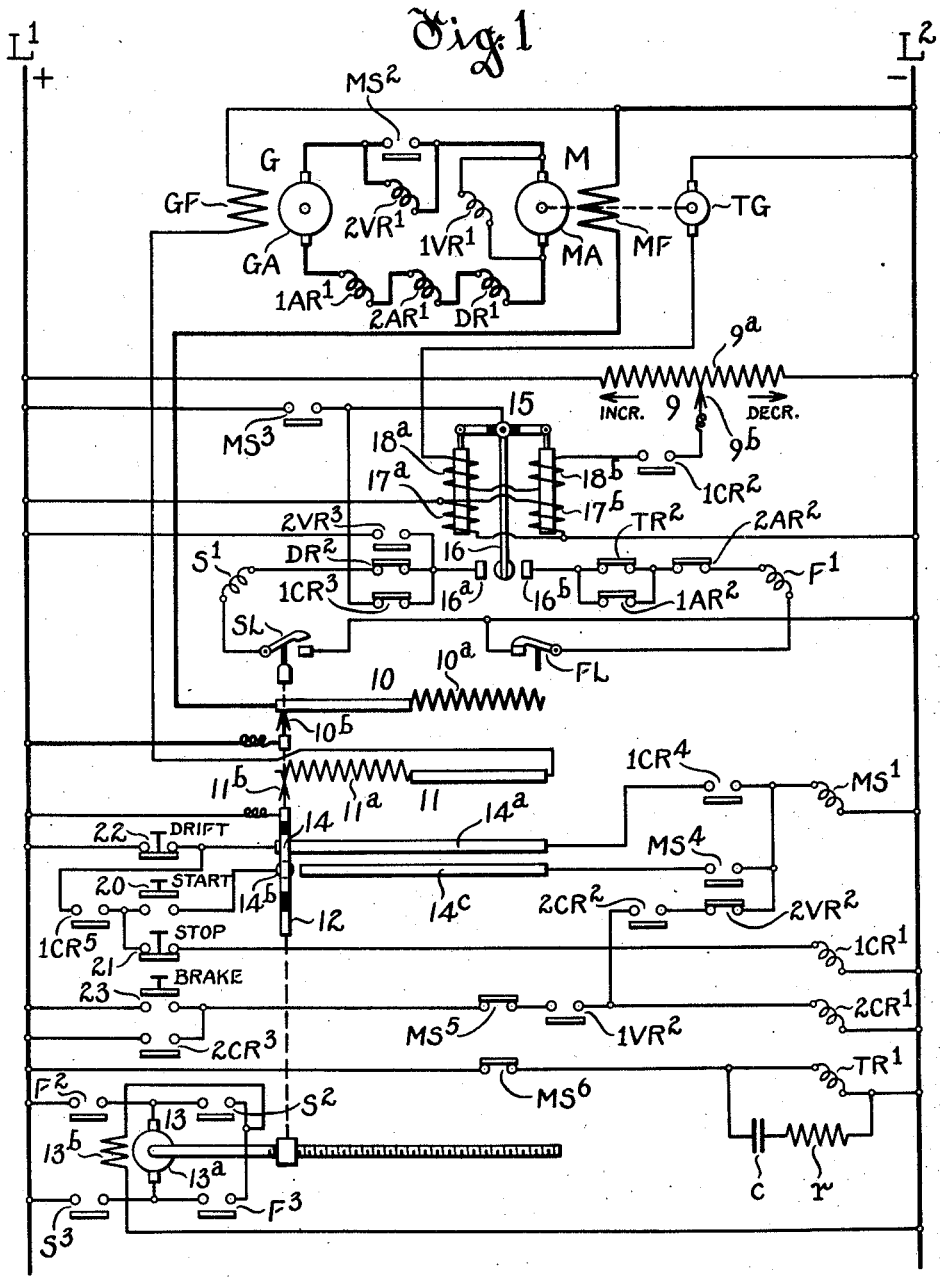

Fig. 2

Patented Dec. 23, 1947

2,433,130

UNITED STATES PATENT OFFICE 2,433,130

SPEED CONTROL FOR WARD LEONARD SYSTEMS

Eivind U. Lassen, Whitefish Bay, Wis., assignor to Cutler-Hammer, Inc., Milwaukee, Wis., a corporation of Delaware Application November 3, 1945, Serial No. 626,514

3 Claims. (Cl. 318—154)

This invention relates to speed regulating systems for electric motors.

The invention relates more particularly to variable voltage drives of the so-called Ward Leonard type in which a driving motor is supplied with current by a variable voltage generator and is used to drive a load of high inertia such as a centrifugal casting machine.

The patent to Jesse E. Jones, No. 2,281,844, issued May 5, 1942, discloses a control system for drives of the aforesaid type including field regulating means which is controlled in accordance with the difference in the output voltage of an adjustable master potentiometer, and the output voltage of a tachometer generator coupled to the driving motor to effect acceleration or deceleration of the driving motor to speeds which are preset on the master potentiometer. In this system the field regulating means operates to effect acceleration and deceleration of the driving motor at a uniform rate regardless of current conditions in the supply circuit of said motor. However it has been found that where the motor is used to drive a load of high inertia such as a centrifugal casting machine it is necessary to vary the rate of operation of the field regulating means so as to prevent excessive current values in the motor circuit during starting and also during regenerative braking operations.

The present invention has among its objects to provide a system of the type disclosed in the aforementioned patent to Jesse E. Jones in which the operation of the field regulating means is not only controlled by differences in the output voltage of the master potentiometer and the tachometer generator but is also controlled by current conditions in the armature circuit of the driving motor to limit the current in such circuit during starting of the motor and also during regenerative braking thereof.

Another object is to provide a system of the aforesaid type which provides for a drifting stop of the motor and which also provides for slow down of the motor by regenerative braking at any point during a drifting stop.

Another object is to provide a system of the aforesaid type in which current in the armature circuit of the motor is maintained below a given limit for a predetermined interval upon starting of the motor and is thereafter permitted to rise to a higher predetermined limit for acceleration of the motor to a preset speed.

Another object is to provide for automatic return of the field regulating means to off position during a drifting stop or a regenerative braking stop of the motor and to also regulate the rate of return of the field regulating means toward off position so that the motor is not subjected to excessive regenerative braking current.

Various other objects and advantages of the invention will hereinafter appear.

The accompanying drawings illustrate a motor control system embodying the invention which will now be described, it being understood that the system illustrated is susceptible of modification without departing from the spirit and scope of the appended claims.

In the drawings,

Figure 1 is an across-the-line diagrammatic representation of a control system embodying the invention, and Fig. 2 is a key illustration of certain switches and relays employed in Fig. 1.

The illustration of the switches and relays in Fig. 2 shows them with their coils and contact members disposed in horizontal alignment with their positions in the across-the-line circuits of Fig. 1 so that the reader may readily determine the position of the coil and contact members of any switch or relay in the across-the-line circuit. The reference characters also serve as a guide to the relation between the operating coils of the switches and relays and their associated contacts. For example, switch MS is provided with an operating coil $M^1$, normally open contacts $MS^2$, $MS^3$ and $MS^4$, and normally closed contacts $MS^5$ and $MS^6$.

In the following description of the control system the switches and relays illustrated in Fig. 2 are named as follows:

MS—main switch.
1AR, 2AR—accelerating relays.
DR—decelerating relay.
TR—timing relay.
1CR—starting relay.
2CR—braking relay.
1VR, 2VR—voltage relays.
S—slow switch.
F—fast switch.

Referring to Fig. 1, the same illustrates a motor M which may be used to drive machines of various types, as for example a centrifugal casting machine which is of high inertia. It is desired to preset the operating speed of motor M either while the same is at rest or in operation and to subsequently cause the speed thereof to change to the preset speed and to be maintained at such speed. As hereinafter set forth, the speed of motor M is preset on a master potentiometer 9 having a resistor $9^a$ which is adjustable by a slider $9^b$ and is connected across a direct current supply circuit indicated by lines $L^1$, $L^2$.

In the system illustrated motor M is supplied with current by a variable voltage generator G which is driven at a substantially constant speed by a suitable prime mover (not shown) such as an induction motor. Motor M is provided with an armature MA and a separately excited field winding MF which is connected across lines $L^1$, $L^2$ in series with a rheostat 10. Generator G is provided with an armature GA and a separately excited field winding GF which is connected across lines $L^1$, $L^2$ in series with a rheostat 11.

Rheostat 10 is provided with a resistor $10^a$ which is adjustable by a movable contact $10^b$, and rheostat 11 is provided with a resistor $11^a$ which is adjustable by a movable contact $11^b$. Contacts $10^b$ and $11^b$ are carried by a rheostat arm 12 which is driven by a reversible motor 13 and resistors $10^a$ and $11^a$ are so arranged that upon movement of said arm toward the right away from the off position shown in Fig. 1 resistor $11^a$ is first excluded from the field circuit of generator G and thereafter resistor $10^a$ is included in the field circuit of motor M. Arm 12 also has a bridging contact 14 associated therewith and as hereinafter set forth said bridging contact cooperates with stationary contacts $14^a$, $14^b$ and $14^c$ to control energizing circuits for starting relay 1CR and main switch MS.

Motor 13 is supplied with current from lines $L^1$, $L^2$ and is provided with an armature $13^a$ and a series field winding $13^b$. The direction of operation of motor 13 is controlled by switches F and S, the former switch providing for operation of said motor in a direction to move contacts $10^b$ and $11^b$ toward the right for acceleration of motor M, and the latter providing for operation of said contacts toward the left for deceleration of said motor. Switches F and S are selectively controlled by a polarized relay 15 which is responsive to differences in potential between slider $9^b$ of the master potentiometer 9 and a tachometer generator TG. Generator TG is coupled to motor M to rotate therewith so that its output voltage is a direct function of the speed of said motor.

Relay 15 is provided with a pivoted contact arm 16 which is movable in one direction out of an intermediate off position to engage a cooperating contact $16^a$ for establishment of an energizing circuit for switch S, and in an opposite direction out of off position to engage a cooperating stationary contact $16^b$ for establishment of an energizing circuit for switch F. Relay 15 is provided with a pair of windings $17^a$ and $17^b$ which are connected across lines $L^1$, $L^2$ and act to exert balanced opposing torques on contact arm 16. Said relay is also provided with series connected actuating windings $18^a$ and $18^b$ which are wound in opposite directions with respect to each other so that current passing therethrough causes movement of contact arm 16 out of off position in one direction or the other depending upon the direction of the current in said coils.

One terminal of tachometer generator TG is connected to line $L^2$ and as hereinafter set forth upon starting of motor M the coils $18^a$ and $18^b$ of relay 15 are connected in series between the opposite terminal of said generator and slider $9^b$ of master potentiometer 9. Assuming that motor M is operating at a speed below the speed preset on master potentiometer 9, current will flow from slider $9^b$ through coils $18^a$ and $18^b$ to generator TG to maintain contact arm 16 in engagement with contact $16^b$ for energization of switch F until motor M is accelerated to the preset speed. On the other hand, assuming that motor M is operating at a speed above the speed preset on master potentiometer 9, current will flow from generator TG through coils $18^a$ and $18^b$ to slider $9^b$ to maintain contact arm 16 in engagement with contact $16^a$ for energization of switch S until motor M is decelerated to the preset speed.

As hereinafter set forth, switch F is controlled by accelerating relays 1AR and 2AR to regulate the rate of acceleration of motor M, and switch S is controlled by decelerating relay DR to regulate the rate of deceleration of said motor. The operating windings of these relays are connected in series in the supply circuit between motor armature MA and generator armature GA. Also as hereinafter set forth, timing relay TR operates after a predetermined interval upon starting of motor M to by-pass accelerating relay 1AR.

Switches F and S are also controlled by limit switches FL and SL, respectively. Limit switch SL provides for deenergization of switch S upon movement of rheostat arm 12 into the extreme off position shown in Fig. 1, and limit switch FL provides for deenergization of switch F upon movement of said arm into its opposite extreme position.

In addition to the aforementioned switches and relays the control system includes a normally open start push button switch 20, a normally closed stop push button switch 21, a normally closed drift push botton switch 22 and a normally open brake push button switch 23. As will now be set forth, start push button switch 20 operates through the medium of relay 1CR to effect starting of motor M, and stop button switch 21 operates through the medium of said relay to effect stopping of said motor by regenerative braking. Also as will now be set forth, drift push button switch 22 provides for control of main switch MS and starting relay 1CR to bring motor M to a drifting stop, and brake push button switch 23 operates through the medium of relay 2CR to effect slow down of motor M by regenerative braking at any time after a drifting stop is initiated by the drift push button switch 22.

When motor M is stopped, rheostat arm 12 is in the off position shown in Fig. 1 and all of the control switches and relays with the exception of timing relay TR are deenergized. The operating winding $TR^1$ of timing relay TR is then connected across lines $L^1$, $L^2$ through the medium of main switch contacts $MS^6$ to hold said relay in open position.

To effect starting of motor M start push button switch 20 is depressed and the operating winding $1CR^1$ of starting relay 1CR is then connected across lines $L^1$, $L^2$ through the medium of drift push button switch 22, rheostat contacts $14^a$, 14 and $14^b$, and stop push button switch 21. Relay 1CR then responds and the operating winding $MS^1$ of main switch MS is energized by current from lines $L^1$, $L^2$ through the medium of drift push button switch 22, rheostat contact $14^a$ and starting relay contacts $1CR^4$. Upon response of main switch MS a low resistance loop circuit is established between the generator armature GA and the motor armature MA by main switch contacts $MS^2$ to provide for starting of motor M. At this time rheostat resistor $11^a$ is included in the field circuit of generator G, and rheostat resistor $10^a$ is excluded from the field circuit of motor M for operation of said motor at its lowest speed.

Immediately upon response of starting relay 1CR the actuating windings $18^a$ and $18^b$ of relay 15 are connected in series between tachometer generator TG and slider $9^b$ of master potentiometer 9 by starting relay contacts $1CR^2$. Assuming that slider $9^b$ is preset for operation of motor M at some intermediate speed or at full speed, current will flow from slider $9^b$ through coils $18^b$ and $18^a$ to the tachometer generator TG to maintain contact arm 16 in engagement with its associated stationary contact $16^b$. Switch F will then be energized by a circuit extending from line $L^1$ through main switch contacts $MS^3$, through contact arm 16 and its associated stationary contact $16^b$, through accelerating relay contacts $1AR^2$ and $2AR^2$, through the operating winding $F^1$ of switch F and through limit switch FL to line $L^2$. Upon response of switch F motor 13 is connected across lines $L^1$, $L^2$ for operation in a direction to advance rheostat arm 12 toward the right for acceleration of motor M.

Upon release of start push button switch 20 starting relay 1CR is maintained energized through the medium of drift push button switch 22, starting relay contacts $1CR^5$ and stop switch 21. Also upon movement of rheostat arm 12 out of "off" position main switch MS is maintained energized through the medium of drift push button switch 22, rheostat contacts $14^a$, 14 and $14^c$ and main switch contacts $MS^4$.

Upon starting of motor M the rate of acceleration thereof is first controlled by accelerating relay 1AR and thereafter by accelerating relay 2AR. Relay 1AR responds to a given high current value in the armature circuit of motor M and upon response of said relay, contacts $1AR^2$ are opened and switch F is thus deenergized to stop accelerating operation of rheostat arm 12. When the current in the armature circuit of motor M subsides accelerating relay 1AR drops out and switch F is again energized for continued accelerating operation of rheostat arm 12.

As hereinbefore stated, prior to starting of motor M the operating winding $TR^1$ of timing relay TR is connected across lines $L^1$, $L^2$ by main switch contacts $MS^6$. Upon starting of motor M timing relay TR is deenergized by opening of main switch contacts $MS^6$ but dropping out of said relay is delayed for a predetermined interval by a resistance $r$ and condenser $c$ which are connected in series across the terminals of its operating winding $TR^1$. Upon dropping out of relay TR the contacts $TR^2$ thereof close to bypass accelerating relay contacts $1AR^2$ and switch F is then controlled by contacts $2AR^2$ of accelerating relay 2AR. Accelerating relay 2AR is set to respond at a higher current value than accelerating switch 1AR. Thus upon dropping out of timing relay TR switch F is controlled by accelerating relay 2AR to control accelerating operations of rheostat arm 12 for an increased rate of acceleration of motor M.

When motor M is brought up to the speed preset on master potentiometer 9 no current will flow through the actuating windings $18^a$ and $18^b$ of relay 15. Contact arm 16 then returns to off position and switch F is thus deenergized to stop rheostat arm 12 in the position it then occupies for continued operation of motor M at the preset speed.

Assuming that motor M is operating at some preset speed and that slider $9^b$ of the master potentiometer is moved to a position for a higher speed. Relay 15 will again operate as hereinbefore set forth to energize switch F for acceleration of motor M until said motor is brought up to the speed corresponding to the setting of the slider $9^b$. On the other hand, assuming that motor M is operating at a preset speed and that slider $9^b$ of master potentiometer 9 is moved to a selected position to reduce the speed thereof. Current will then flow from tachometer generator TG through actuating coils $18^a$ and $18^b$ of relay 15 to the slider $9^b$ and contact arm 16 will be moved into engagement with its associated stationary contact $16^a$. The operating winding $S^1$ of switch S will then be connected across lines $L^1$, $L^2$ through the medium of main switch contacts $MS^3$, decelerating relay contacts $DR^2$ and limit switch SL. Switch S then responds and motor 13 is connected across lines $L^1$, $L^2$ for operation in a direction to move rheostat arm 12 toward off position for slowdown of motor M by regeneration. Decelerating relay DR is set to respond if the regenerated current exceeds a predetermined value, and in responding said relay opens its contacts $DR^2$ to deenergize switch S. Slowdown operation of rheostat arm 12 is thus stopped until the regenerated current drops sufficiently to permit dropping out of relay DR, whereupon switch S is again energized for further slowdown operation of rheostat arm 12. When motor M is slowed down to the speed selected on potentiometer 9 no current will flow in windings $18^a$ and $18^b$. Contact arm 16 then returns to off position and switch S is deenergized to stop rheostat arm 12 in the position it then occupies for continued operation of Motor M at the selected speed.

Assuming now that motor M is operating at some preset speed and that it is desired to effect quick stopping thereof by regenerative braking. Stop push button switch 21 is operated to interrupt the aforedescribed maintaining circuit for starting relay 1CR. Main switch MS is maintained energized through the medium of drift push button switch 22, rheostat contacts $14^a$, 14 and $14^c$ and main switch contacts $MS^4$, and upon dropping out of starting relay 1CR switch S is connected across lines $L^1$, $L^2$ through the medium of main switch contacts $MS^3$, starting relay contacts $1CR^3$, decelerating contacts $DR^2$ and limit switch SL. Switch S is thus energized to return rheostat arm 12 toward off position for slowdown of motor M by regeneration. During return of rheostat arm 12 toward off position switch S is controlled as hereinbefore set forth by decelerating relay DR to temporarily stop operation of said arm when the regenerated current exceeds a given value. Upon movement of rheostat arm 12 into off position the aforedescribed maintaining circuit for main switch MS is opened by disengagement of rheostat contact 14 from its associated stationary contact $14^c$ and the energizing circuit for switch S is opened by limit switch SL. Motor M is thus stopped and the system is reset for starting of said motor by start push button switch 20.

It is sometimes desirable to slow down motor

M without regenerative braking by merely letting the same drift to a stop. For this purpose drift push button 20 is depressed to open the aforedescribed maintaining circuits for main switch MS and starting relay 1CR. Upon dropping out of main switch MS the operating winding of voltage relay winding 2VR is included in the loop circuit between generator armature GA and motor armature MA by opening of contacts MS² and contact arm 16 of voltage relay 15 is disconnected from line L¹ by opening of contacts MS³ to render said relay ineffective. Only a very small amount of current can flow through voltage relay winding 2VR¹ and motor M will therefore drift until the same comes to a stop. Upon slowing down of motor M the counter voltage thereof drops below the voltage of generator G. Relay 2VR then responds and the operating winding S¹ of switch S is connected across lines L¹, L² through the medium of voltage relay contacts 2VR³, decelerating relay contacts DR² and limit switch SL. Motor 13 is thus energized to return rheostat arm 12 toward off position and when the generator voltage becomes approximately the same as the counter voltage of motor M voltage relay 2VR drops out to stop operation of said arm. Relay 2VR will therefore operate intermittently during a drifting stop to maintain the generator and motor voltages at approximately the same value until rheostat arm 12 is returned to off position. This enables proper slow down of the motor M by regenerative braking at any time during a drifting stop by operation of brake push button 23.

The operating winding 1VR¹ of voltage relay 1VR is connected across the armature of motor M and during a drifting stop said relay is maintained in closed position. Upon depression of the brake push button switch 23 the operating winding 2CR¹ of braking relay 2CR is connected across lines L¹, L² through the medium of main switch contacts MS⁵ and voltage relay contacts 1VR², and upon release of said brake push button switch said relay is maintained energized through the medium of its associated contacts 2CR³. When the counter voltage of motor M is approximately the same as the voltage of generator G relay 2VR is in normal position and upon closure of braking relay 2CR main switch MS is energized by a circuit extending from line L¹ through starting relay contacts 2CR³, main switch contacts MS⁵, voltage relay contacts 1VR², starting relay contacts 2CR², voltage relay contacts 2VR² and through said main switch winding MS¹ to line L². Main switch MS then responds and the loop circuit between generator armature GA and motor armature MA is reestablished by contacts MS² for slow down of the motor by regenerative braking. Upon response of main switch MS braking relay 2CR is deenergized by opening of main switch contacts MS⁵ and said main switch is then maintained energized through the medium of its associated contacts MS⁴. Also upon response of main switch MS circuit is reestablished from line L¹ to contact arm 16 through the medium of main switch contacts MS³. Switch S is then controlled as hereinbefore set forth through the medium of decelerating relay DR for return of rheostat arm 12 toward off position. Main switch MS is deenergized upon return of rheostat arm 12 to off position, but as is apparent, prior to return of rheostat arm 12 to off position an additional drift period can be started by depression of drift push button switch 22.

What I claim as new and desire to secure by Letters Patent is:

1. The combination with a direct current motor and a direct current generator for supplying current thereto, of a normally open main switch for establishing a low resistance supply circuit between said motor and said generator, an adjustable field regulator movable out of a given normal position to strengthen the field of said generator for acceleration of said motor and returnable toward normal position to weaken the field of said generator for deceleration of said motor by regenerative operation thereof, a tachometer generator coupled to said motor for supplying a voltage which is a function of the speed of said motor, a speed setting potentiometer for supplying an adjustable output voltage, means rendered operative upon closure of said main switch and responsive to voltage differentials between said tachometer and said speed setting potentiometer for automatically controlling said field regulator to effect operation of said motor at speeds determined by the setting of said potentiometer, and means associated with said last mentioned means for temporarily arresting operation of said field regulator during accelerating or decelerating operations thereof in response to predetermined high current conditions in said supply circuit.

2. The combination with a direct current motor and a direct current generator for supplying current thereto, of a normally open main switch for establishing a low resistance supply circuit between said motor and said generator, a speed selecting device, an adjustable field regulator rendered operative upon closure of said main switch for automatically controlling the field of said generator for operation of said motor at speeds determined by the setting of said speed selecting device, said field regulator being movable out of a given normal position to strengthen the field of said generator for acceleration of said motor and being returnable to normal position to weaken the field of said generator for deceleration of said motor by regenerative braking operation thereof, manually controlled means for opening said main switch for a drifting stop of said motor and for reclosing the same at any time during a drifting stop for slowdown of said motor by regenerative operation thereof, and means rendered operative upon opening of said main switch for a drifting stop to automatically return said field regulator toward normal position at a rate to prevent substantial variation between the output voltage of said generator and the counter E. M. F. of said motor through the drifting period.

3. The combination with a direct current motor and a direct current generator for supplying current thereto, of a normally open main switch for establishing a low resistance supply circuit between said motor and said generator, a speed selecting device, an adjustable field regulator rendered operative upon closure of said main switch to effect operation of said motor at speeds determined by the setting of said speed selecting device, said field regulator being movable out of a given normal position to strengthen the field of said generator for acceleration of said motor, and being returnable to normal position to weaken the field of said generator for deceleration of said motor by regenerative braking, manually controlled means effective upon movement of said field regulator out of normal position to restore the same to such position for stopping of said motor by regenerative operation thereof, a second manually controlled means for opening said main switch for a drifting stop of said motor and for reclosing the same at any time during a drifting stop for slowdown of said motor by regenerative operation thereof, and means rendered operative upon opening of said main switch for a drifting stop for automatically returning said field regulator to normal position at a rate to prevent substantial variation between the output voltage of said generator and the counter E. M. F. of said motor during the drifting period.

EIVIND U. LASSEN.

REFERENCES CITED

The following references are of record in the file of this patent:

UNITED STATES PATENTS

| Number | Name | Date |
| --- | --- | --- |
| 2,281,844 | Jones | May 5, 1942 |
| 988,028 | Powell | Mar. 28, 1911 |
| 989,063 | Schley | Apr. 11, 1911 |